(12) United States Patent
Simonsohn

(10) Patent No.: US 8,192,816 B2
(45) Date of Patent: Jun. 5, 2012

(54) SUPPORT COIL WITH MECHANICAL LOCKING DEVICE AND METHOD FOR ITS MANUFACTURE

(75) Inventor: Thilo Simonsohn, München (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 584 days.

(21) Appl. No.: 12/302,117

(22) PCT Filed: May 5, 2007

(86) PCT No.: PCT/EP2007/004636
§ 371 (c)(1),
(2), (4) Date: Nov. 24, 2008

(87) PCT Pub. No.: WO2007/134872
PCT Pub. Date: Nov. 29, 2007

(65) Prior Publication Data
US 2009/0269529 A1 Oct. 29, 2009

(30) Foreign Application Priority Data

May 24, 2006 (DE) .......................... 10 2006 024 840
Apr. 19, 2007 (DE) .......................... 10 2007 018 915

(51) Int. Cl.
*B29D 22/00* (2006.01)
*B29D 23/00* (2006.01)
*B32B 1/08* (2006.01)
*B32B 15/08* (2006.01)

(52) U.S. Cl. .................. 428/35.8; 428/60; 428/34.1

(58) Field of Classification Search .................. 428/35.8, 428/60, 36.9, 57
See application file for complete search history.

(56) References Cited

U.S. PATENT DOCUMENTS

| 4,503,105 A | 3/1985 | Tomioka |
| 5,670,223 A * | 9/1997 | Sadlo et al. .................. 428/34.9 |
| 5,800,886 A * | 9/1998 | Vallauri et al. ............... 428/35.8 |
| 6,337,440 B1 * | 1/2002 | Ions et al. .................... 174/74 A |
| 6,455,117 B1 * | 9/2002 | Margucci .................... 428/36.91 |
| 7,744,977 B2 * | 6/2010 | Simonsohn et al. ............ 428/57 |

FOREIGN PATENT DOCUMENTS

| DE | 19820634 C1 | 2/2000 |
| EP | 0291203 A2 | 11/1988 |
| EP | 0619636 A1 | 10/1994 |
| EP | 0735639 A1 | 10/1996 |
| WO | WO 9821802 A1 * | 5/1998 |

* cited by examiner

*Primary Examiner* — David Sample
*Assistant Examiner* — Nathan Van Sell
(74) *Attorney, Agent, or Firm* — Barley Snyder

(57) ABSTRACT

The present invention relates to a tubular support coil for radial support of resiliently expanded tubing material, made from at least one extruded profile body wound into a plurality of windings, the end faces of the extruded profile body being connected to each other at least in portions in the longitudinal direction of the support coil and interlocked by a ratchet arrangement in the longitudinal direction and by a tongue and groove arrangement in a radial direction. To create an improved support coil, which is inexpensive to produce, reliably withstands exterior pressing forces and can easily be taken apart manually with low releasing forces and removed from the tubing material, it is proposed that the present invention has a rotation prevention means, through which adjacent windings are held secure against rotation.

24 Claims, 6 Drawing Sheets

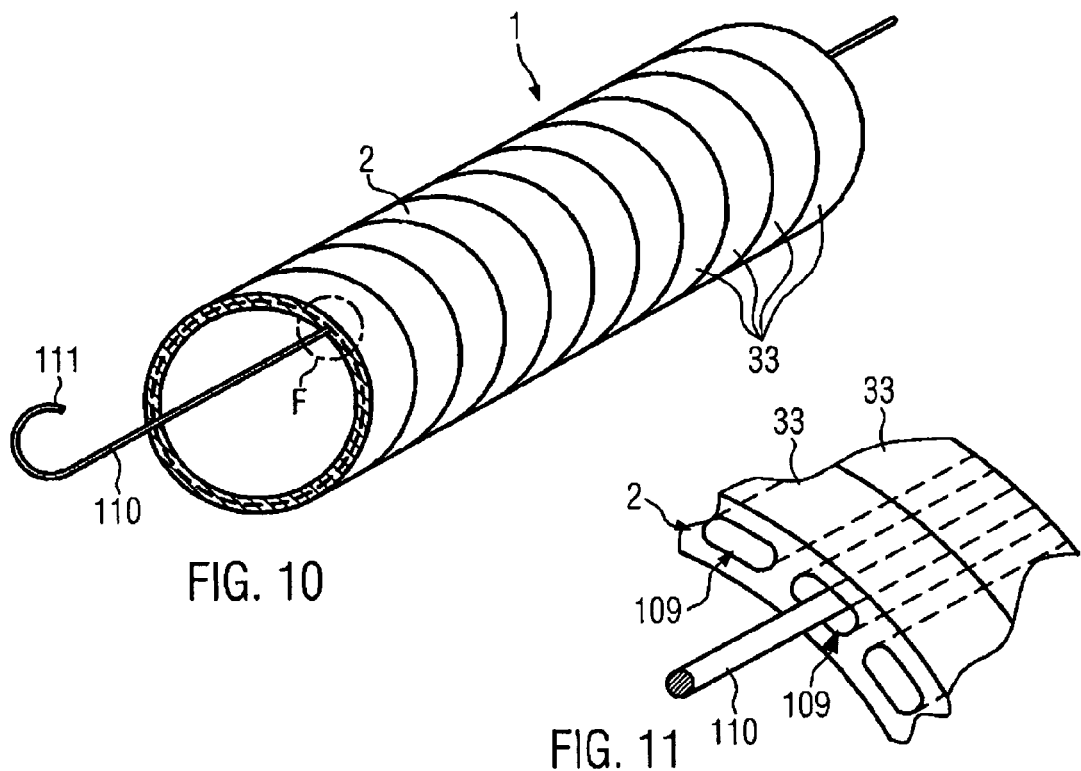
FIG. 10
FIG. 11
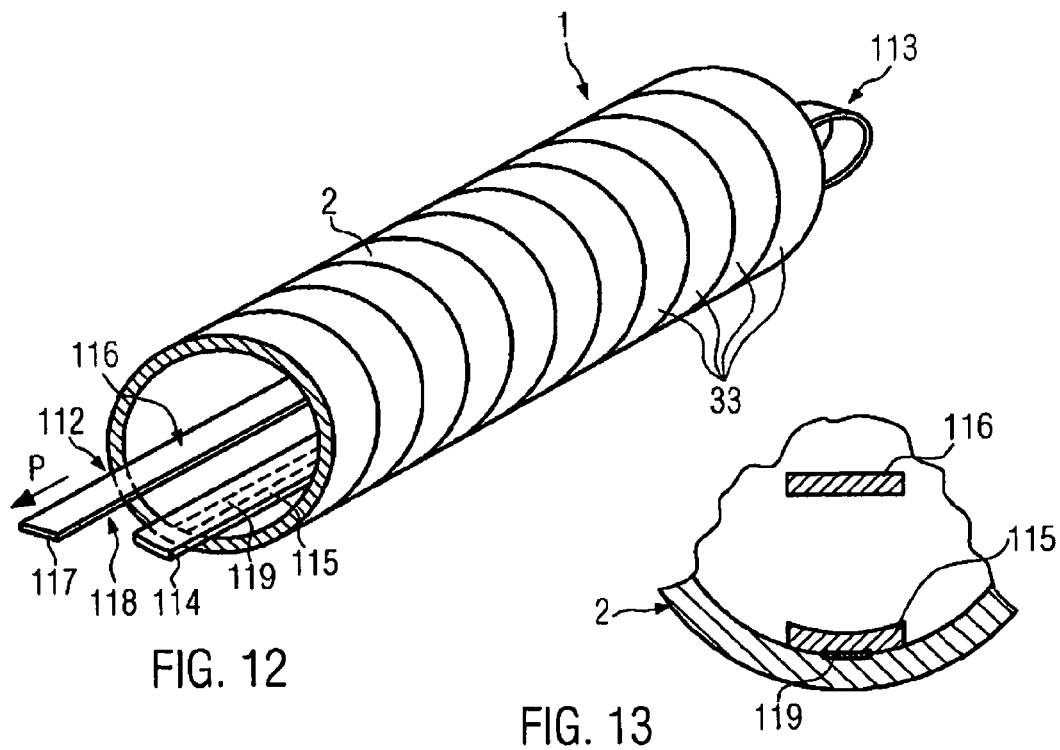
FIG. 12
FIG. 13

SUPPORT COIL WITH MECHANICAL LOCKING DEVICE AND METHOD FOR ITS MANUFACTURE

CROSS-REFERENCE TO RELATED APPLICATION DATA

This application is a National Stage Application filed under 35 U.S.C. §371 of PCT/EP2007/004636, filed on May 24, 2007, which claims priority of German Application Nos.: DE 10 2006 024 840.6, filed May 24, 2006 and DE 10 2007 18 915.1, filed on Apr. 19, 2007.

FIELD OF THE INVENTION

The invention relates to a support coil for the radial support of resiliently expanded tubing material and more particularly to a support coil for radial support of resiliently expanded tubing material and characterized by a rotation prevention means, through which adjacent turns are held secure against rotation.

BACKGROUND

Support coils, for the radial support of resiliently expanded tubing material, are readily known in the art, and are used to maintain pre-assembled structure, for example, insulating tubes and socket members in an expanded state before final assembly. Insulating tubes and socket members are used for the electrical insulation or sealing of electrical components in the energy industry, such as cable couplings or cable connectors, for example. Because high voltages of over 100 kV, for example, can be applied to these components, the insulating tubes are developed with thick walls and manufactured from materials that insulate well, such as silicone, for example. Such tubing materials, so-called cold shrink tubing, should resiliently match the outer contours of the component to be insulated and enclose it with no gaps if possible. Therefore, the tubing material is expanded resiliently up to 4 times its diameter before assembly. The electrical and other components can therefore be easily inserted into the tubing material.

In order to keep the tubing material in its expanded state until it is assembled, a supporting body in the form of the above-mentioned support coil is inserted into the tubing material, which absorbs the restoring force of the tubing material that is present due to the resilient expansion. To assemble, the component that is to be enclosed is positioned inside the support coil, which has a hollow interior. Then the support coil must be removed from the tubing material so that the tubing material can shrink around the component.

In order to be able to remove the support coil, which is tightly enclosed by the tubing material, upon which pressing forces of up to 10 bar, for example, can be applied, manually from the tubing material, support coils of the above-mentioned type have proved themselves. This type of support coil can be dismantled in stages in a longitudinal direction by unwinding the extruded profile body, in that the unwound extruded profile body pulled out by the hollow support coil. When the support coil is dismantled in stages in this way the tubing material shrinks around the component to be insulated by itself. In this way, the support coil can be removed manually from the tubing material without further tools or devices.

Consequently, the support coil of the stated type must on one hand be able to constantly withstand high pressure emanating from the expanded tubing material and on the other be manually removable from the tubing material by pulling the extruded profile body out. Furthermore, it is important for the support coil that there is enough overall space available inside the interior of the support coil, due to a wall thickness that is as thin as possible, to insert the component to be enclosed.

In order to fulfill these requirements, the front faces of the wound extruded profile body are connected to each other and joined together in the known support coils in a material-uniting manner, for example, by welding or gluing. The front faces to be connected are also formed so that they link into each other.

Known support coils are described for example in U.S. Pat. No. 5,087,492, EP 0 619 636 A1, WO 93/22816, WO 83/00779, DE 19820634 C1, EP 0399263 A2, U.S. Pat. No. 5,670,223 and WO 96/24977.

Generic support coils, for example U.S. Pat. No. 5,670,223, are based on the principle that the elements of the tongue and groove arrangement or the ratchet arrangement of the adjacent turns that are to be connected to each other are connected to each other frictionally, so that no substantial reduction of the interior space being kept free by the support coil can take place substantially through the resilient restoring force of the expanded tubing material that is being applied from the outside. This requirement, however, is in opposition to the endeavor of manually removing the extruded profile body easily from the tubing material. Whilst for the first issue an intimate connection of adjacent turns is desirable, it is actually a hindrance to the second issue. Furthermore, variations in the dimensional accuracy, particularly of the tongue and groove or ratchet arrangements, lead to a non-uniform connection. The releasing forces needed for the manual unwinding of the extruded profile body can sometimes vary greatly due to these non-uniform connections, so that the separation of the connected front faces can be made more difficult or manually impossible when the support coil is being dismantled, or the tubular support coil can fail and break under the pressure of the resiliently expanded tubing material. On the other hand, the support coil must also reliably take up the high restoring forces of the expanded tubing material without this making the removal of the support coil more difficult or even impossible in the process.

SUMMARY

It is an object of the present invention to provide an improved support coil in comparison to the prior art, which is inexpensive to produce, reliably withstands the pressing forces being applied radially from outside and can easily be dismantled manually with low releasing force, and removed from the tubing material.

It is proposed to achieve this object of the present invention by improving the generic tubular support coil with a rotation prevention means, through which adjacent turns are held secure against rotation.

It is further an object of the invention to provide a support coil for radial support of resiliently expanded tubing material, made from at least one extruded profile body wound into a plurality of turns, the end faces of the extruded profile body being connected to each other at least in portions in the longitudinal direction of the support coil and interlocked by a ratchet arrangement in the longitudinal direction and by a tongue and groove arrangement in a radial direction, wherein a rotation prevention means, through which adjacent turns are held secure against rotation.

BRIEF DESCRIPTION OF THE DRAWINGS

The invention will be explained below in greater detail with reference to the exemplary embodiments shown in the accompanying drawings. Similar or corresponding individual parts of the subject according to the invention are provided with the same reference numerals. In the drawings:

FIG. 10 shows a perspective side view of a sixth embodiment of the support coil according to the invention;

FIG. 11 shows an enlarged view of the detail F drawn in FIG. 10;

FIG. 12 shows a perspective side view of a seventh embodiment of the support coil according to the invention;

FIG. 13 shows an enlarged longitudinal section through the embodiment shown in FIG. 12;

DETAILED DESCRIPTION OF THE EMBODIMENTS

Figure 1:
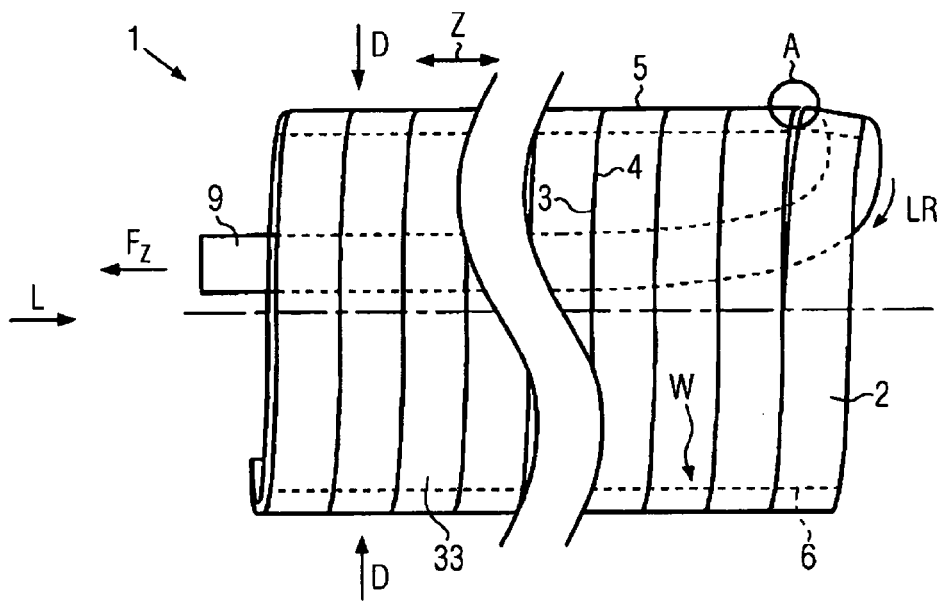
FIG. 1 shows a schematic view of an embodiment by way of example of a support coil according to the invention.

FIGS. 1-4 show a support coil 1 according to a first embodiment of the present invention. As shown in FIG. 1, the support coil 1 consists of an extruded profile body 2 wound in a winding direction W to form a plurality of windings 33. A free end 9 of the windings 33 extends from the support coil 1. The extruded profile body 2 is a substantially continuous member produced, for example, by extrusion. The extruded profile body 2 may be formed from a flexible and solid material, such as a plastic material, so that the support coil 1 is able to withstand radially inwardly acting compressive forces D. The support coil 1 has a length of about 30-50 centimeters; however, the support coil 1 may theoretically be produced to have an infinite length.

The support coil 1 extends in a longitudinal axis L. The support coil 1 is substantially tubular and has a radial external surface 5 and a radial internal surface 6. The external surface 5 and the internal surface 6 are formed substantially parallel to each other in cross-section and form a substantially cylindrical external circumferential surface and a substantially cylindrical internal circumferential surface, respectively, of the support coil 1. Although the support coil 1 is shown and described as having a substantially circular cross-section, it will be appreciated by those skilled in the art that the support coil 1 may have other cross-sectional configurations, for example, the cross-section may be oval or square.

Figure 3:
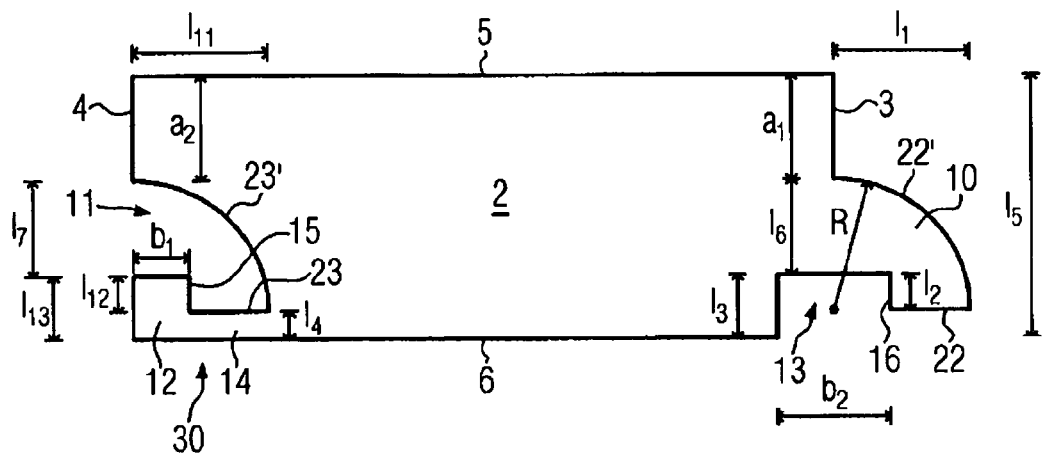
FIG. 3 shows a schematic view of the extruded profile body of FIGS. 1 and 2 in cross-section.

Each of the windings 33 of the extruded profile body 2 has end faces 3, 4 that extend substantially parallel to each other. As shown in FIG. 3, the end face 3 has a tongue 10 and a ratchet mount 13. The tongue 10 forms the ratchet mount 13 in certain portions. The tongue 10 projects in the longitudinal axis L in cross-section and is at a distance $a_1$ from the external surface 5. Between the external surface 5 and the tongue 10, the end face 3 extends substantially perpendicularly to the external surface 5 and the internal surface 6. The tongue 10 has a radial thickness $I_6$. The tongue 10 has a radially outwardly outer holding face 22' having a substantially circular contour with a radius R about a center point M. The substantially circular contour of the outer holding face 22' extends about a quarter of a full circle over about 90 degrees so a protruding length $I_1$ of the tongue 10 is identical or substantially similar to the radius R. The tongue 10 has a radially inwardly inner holding face 22 that extends substantially in the longitudinal axis L parallel to the external and internal surfaces 5, 6. The inner holding face 22 has a step that forms a counter-holding face 16 that is part of a substantially rectangular channel formed by the ratchet mount 13. The ratchet mount 13 has a depth $I_2$ relative to the radially inwardly side of the tongue 10 and a depth $I_3$ relative to the internal surface 6. The depth $I_3$ is greater than the depth $I_2$. The ratchet mount 13 has a width $b_2$.

As shown in FIG. 3, the end face 4 opposes the end face 3 and has a groove 11 and a ratchet element 12. The groove 11 is formed so as to be substantially complementary to the tongue 10. The groove 11 has a radially outwardly outer counter-holding face 23' having a substantially identical circular contour to the outer holding face 22'. The groove 11 has a depth $I_{11}$ in the longitudinal axis L that is substantially identical to the length $I_1$ of the tongue 10. The groove 11 is set apart from the external surface 5 by a distance $a_2$, which is substantially identical to the distance $a_1$. The groove 11 is delimited radially inwardly by an inner counter-holding face 23 formed on a projection 14 that protrudes in the longitudinal axis L. The projection 14 is connected to the ratchet element 12. The projection 14 has a radial thickness $I_4$. The radial thickness $I_4$ of the projection 14 is less than a radial thickness $I_5$ of the extruded profile body 2 and less than the radial thickness $I_6$ of the tongue 10. The projection 14 is therefore the region on the extruded profile body 2 with the lowest radial thickness and thus forms a weakened region 30. An opening to the groove 11 has a radial thickness $I_7$, which is substantially identical to the radial thickness $I_6$ of the tongue 10. The ratchet element 12 at the end of the projection 14 has a substantially rectangular configuration and has a radial thickness $I_{13}$ which is substantially identical to the depth $I_3$ of the ratchet mount 13. Relative to the projection 14, the ratchet element 12 protrudes radially outward by a length $I_{12}$ to form a holding face 15. The length $I_{12}$ is substantially identical to the depth $I_2$ of the ratchet mount 13. The ratchet element 12 has a width $b_1$ in the longitudinal axis L that is less than the width $b_2$ of the ratchet mount 13. Both the ratchet element 12 and the projection 14 extend radially internally flush in the longitudinal axis L.

Figure 2:
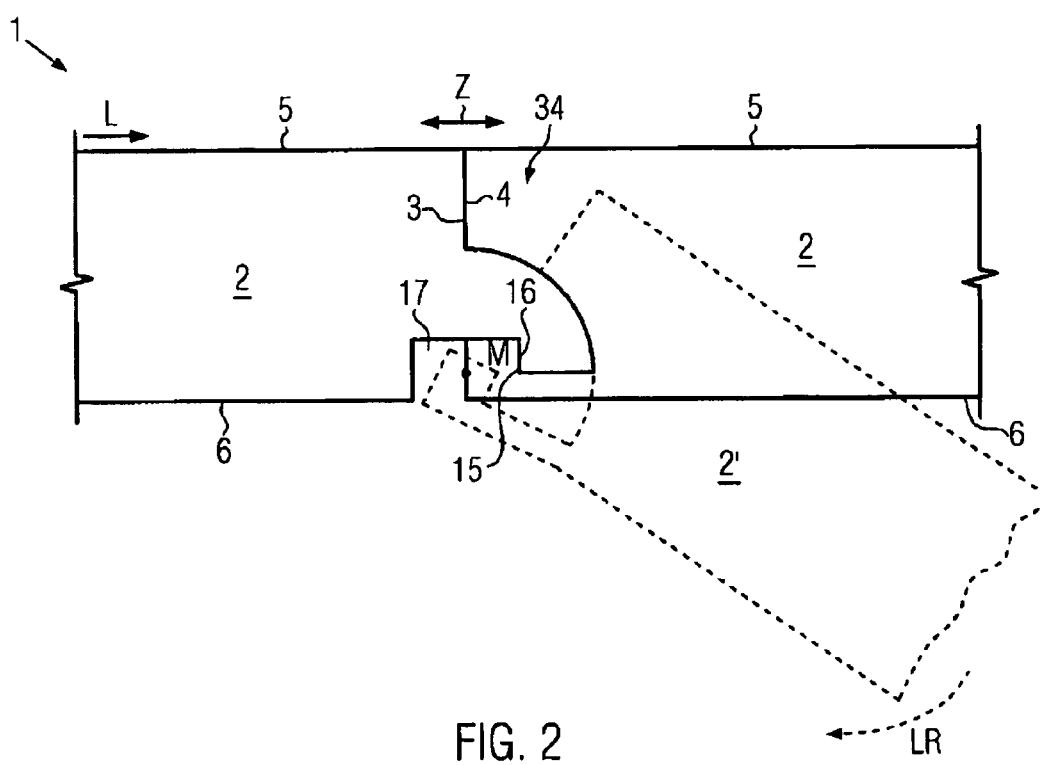
FIG. 2 shows a schematic sectional view of the detail A of FIG. 1.

As shown in FIG. 2, the tongue 10 and the groove 11 form a tongue and groove arrangement, and the ratchet element 12 and the ratchet mount 13 form a ratchet arrangement 12 wherein both the tongue and groove arrangement and the ratchet arrangement 12 engage to join the end faces 3, 4 of adjacent windings 33 together with respect to the longitudinal axis L of the support coil 1. The end faces 3, 4 of the extruded profile body 2 are therefore locked together in a radial direction. More specifically, as the ratchet element 12 on the end face 4 engages with the ratchet mount 13 on the end face 3, the holding face 15 of the ratchet element 12 rests against the counter-holding face 16 of the ratchet mount 13 so that the end faces 3, 4 of the extruded profile body 2 are locked in the longitudinal axis L thereby preventing separation of the end faces 3, 4 by a tensile force Z. The holding face 15 and the counter-holding face 16 are both oriented substantially perpendicularly to the longitudinal axis L. As the width $b_1$ and the cross-sectional surface area of the ratchet element 12 are smaller than the width $b_2$ and the cross-sectional surface area of the ratchet mount 13, the ratchet mount 13 has a deflection region 17 in the form of an opening, which is not filled by the ratchet element 12. The tongue and groove arrangement, the end faces 3, 4 and/or the ratchet arrangement 12 may additionally be at least partially bonded or welded together.

FIG. 2 shows in phantom the extruded profile body 2' during the separation of adjacent windings 33 of the support coil 1. When the free end 9 of the windings 33 shown in FIG. 1 is manually pulled, a detachment force Fz acts on the windings 33. The windings 33 of the support coil 1 are rotated radially inwardly in a detachment direction LR. This rotation is carried out substantially about an instantaneous center of rotation (the pivot point M). During this movement, the end faces 3, 4 on the radially outer side move apart from each other and form a radially inwardly tapering gap 34, as shown in FIG. 2. On the radially inner side, the rotational movement in the detachment direction LR away from the counter-holding face 16 causes the ratchet element 12 to be pressed into the deflection region 17. The ratchet element 12 is pressed radially outwardly against the ratchet mount 13, so the projection 14, which, as a result of the lowest thickness $I_4$, has the greatest deflectability on the extruded profile body 2', is elastically deformed. As the radially outer contour of the tongue and groove arrangement extends about the pivot point M, the tongue 10 moves smoothly out of the groove 11, as the outer counter-holding face 23' slides on the outer holding face 22'. Thus, the detaching force Fz can easily be manually applied, because merely a force for resiliently bending the projection 14 in the weakened region 30 and frictional forces in the tongue and groove arrangement have to be applied in order to detach the extruded profile body 2'.

Figure 4:
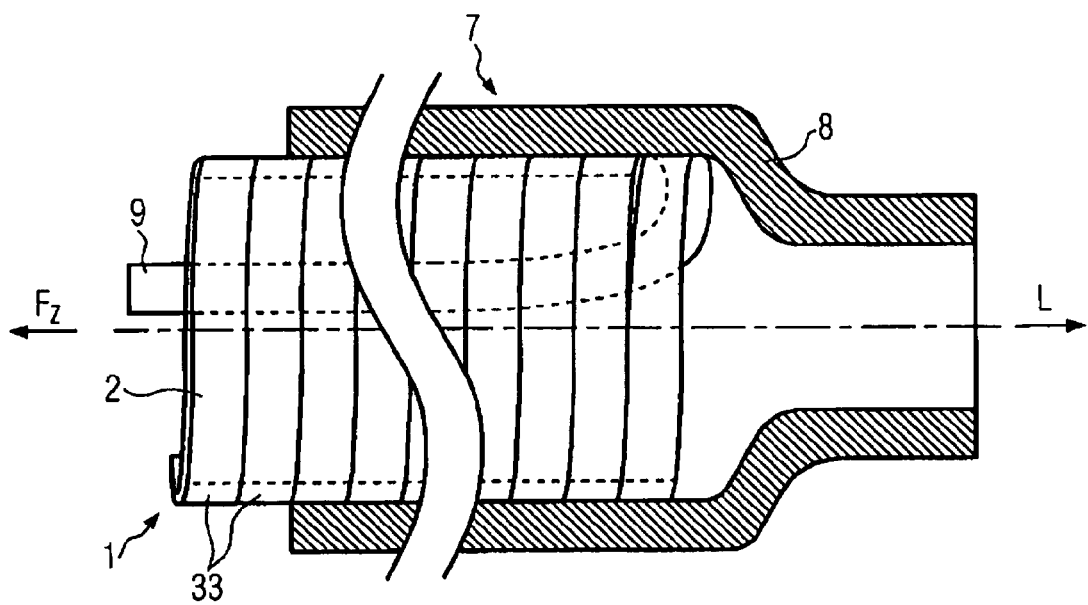
FIG. 4 shows a schematic view of a tubing arrangement according to the invention with the support coil from FIG. 1.

FIG. 4 shows the coil support 1 used in a tube arrangement 7. In the tube arrangement 7, a resiliently expanded tube material 8, such as an insulating tube or sleeve body used for electrically insulating electrical components, is radially expanded by the support coil 1. The tube material 8 may be, for example, a resilient electrically insulating material, such as silicone. In order to be able to easily position the tube material 8 around the electrical component (not shown), the tube material 8 is expanded by the support coil 1. The electrical component (not shown) is then inserted into the support coil 1. The support coil 1 is then unwound by pulling on the free end 9 of the extruded profile body 2 with the tensile force Fz. The windings 33 of the extruded body 2 are withdrawn from the tube arrangement 7 in the longitudinal axis L. As the windings 33 of the extruded body 2 are removed from the tube material 8, the expanded tube material 8 contracts around the electrical component (not shown), as shown schematically on the right-hand side of FIG. 4.

The present invention is derived from the consideration that the substantial supporting and retaining forces are held by the tongue and groove connection or ratchet arrangement 12 in the axial and radial directions, as described above. However, other embodiment, shown in FIGS. 5-15, provide a rotation prevention means through which adjacent windings 33 are held secure against rotation, so that the adjacent windings 33 are prevented from slipping apart, which would eventually lead to a reduction in the diameter of the support coil 1.

FIGS. 5-15 show further embodiments of an extruded profile body 2 of a support coil 1 according to the present invention. Since the additional embodiments of the extruded profile body 2 of the support coil 1 are substantially identical to the extruded profile body 2 of the support coil 1 according to the first embodiment of the present invention, identical elements will be described using the same reference numerals hereafter and only the differences there between will be described in greater detail.

Figure 5:
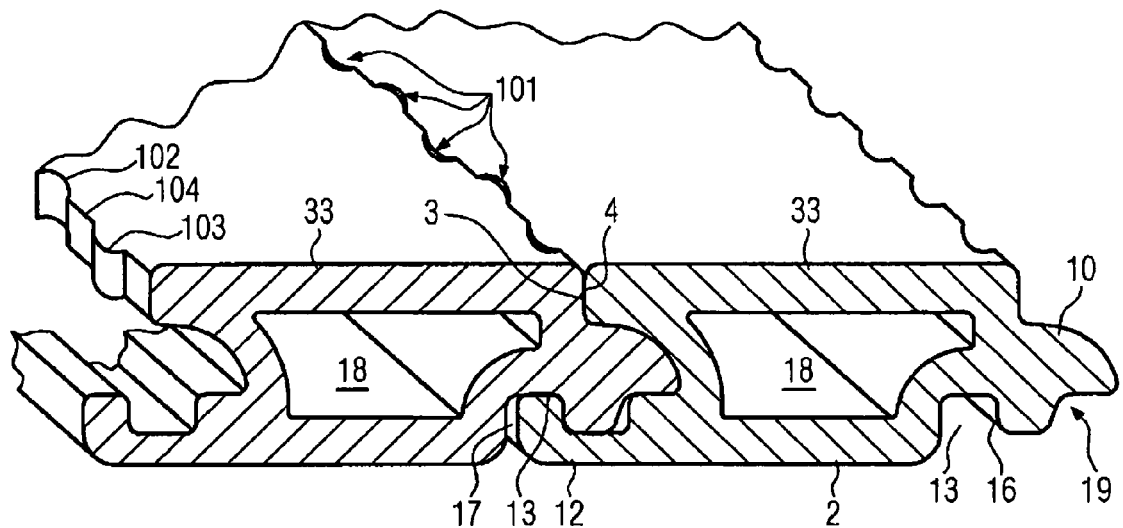
FIG. 5 shows a schematic, perspective, side view of a second embodiment of a support coil.

FIG. 5 shows a sectional view of an embodiment very similar to the embodiment shown in FIG. 5. Identical elements are given the same reference numerals. The outer surfaces of the individual windings 33 are shown at least partially, as well as the sectional surfaces of the respective extruded profile body 2.

The radially outer part, of the end faces 3, 4 of the two extruded profile bodies 2, is provided with a friction-increasing irregularity in the form of flute-like shape profiling 101. There are corresponding flute troughs 102 and flute peaks 103 on opposite end faces 3, 4. Between the flute troughs 102 and the flute peaks 103 of an end face 3, 4 there is a plateau 104, which extends in an axial direction of the support coil 1.

The friction-increasing irregularities, such as flute-like shape profiling 101, made up of the flute troughs 102, flute plateaus 104 and flute peaks 103, can be created during the manufacture of the extruded profile body 2, which is usually formed from plastic material, through forming and/or grinding processes. In the case of forming processing, for example, the stamping of the irregularities may be accomplished by a knurling wheel onto the extruded profile body 2 that is initially extruded as continuous material.

The friction-increasing irregularities can just as well be created by the sand blasting of the end faces 3, 4 later when they are located next to each other in their joined state. The actual configuration of the irregularities on the outer circumferential surface and/or end faces 3, 4 is at the discretion of skilled in the art. The person skilled in the art will select suitable profiling 101, particularly on the basis of the properties of the resiliently expanded tubing material, which has a sufficiently positive locking effect for the formation of a rotation prevention means without damaging the resiliently expanded tubing material or even cutting through it. The tubing material to be resiliently laid onto the support coil 1 is laid onto these irregularities on the outer circumferential surface. A corresponding mechanical clamping takes place between the tubing material and the support coil 1.

The profiling 101, made up of the flute troughs 102, flute plateaus 104 and flute peaks 103, is provided over the whole circumferential surface between the two end faces 3, 4.

When the support coil 1 is disassembled, by the removal of the individual coils, i.e. windings 33 of the extruded profile body 2, through the support coil 1, the extruded profile body 12 in unwinding direction is first bent radially inwards so that the end faces 3, 4 come apart, particularly in the region of the profiling 101. Disassembling the support coil 1 is enhanced by the particular arrangement of the ratchet arrangement 12, 13 on one hand and the tongue and groove arrangement 10, 11 on the other—as described above.

The friction-increasing irregularities on the front faces and also the friction-increasing irregularities on the outer circumferential surface of the wound extruded profile body 2 have the effect of increased mechanical interleaving of the individual parts of the tubular support coil 1 and the tubing material, so that the individual windings 33 of the wound extruded profile body 2 can no longer slip or slide relative to each other. A greater accuracy of the desired outer diameter of the support coil 1 is ensured by the measures taken. The previously mentioned measures can be provided in combination with each other.

A corresponding rotation prevention means provided on the end faces 3, 4 can also be combined with other rotation prevention means provided on the inner circumferential surface and/or the outer circumferential surface of the support coil 1, if desired.

Figure 6:
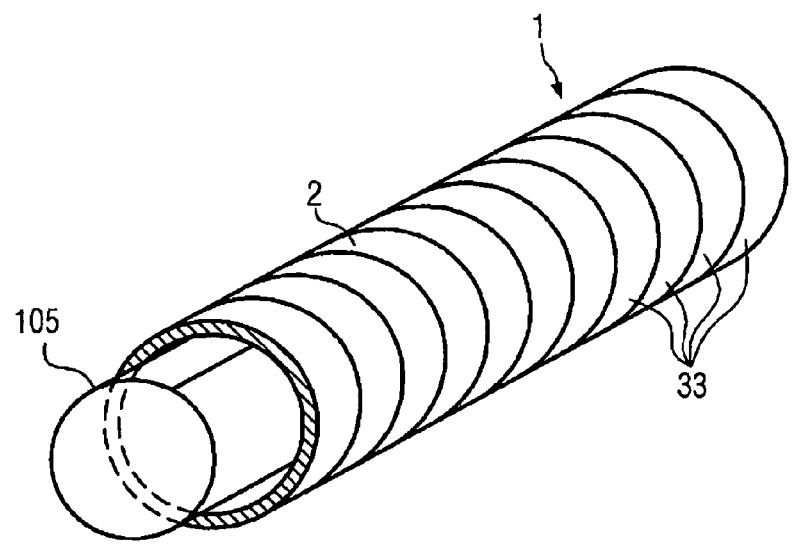
FIG. 6 shows a perspective side view of a third embodiment of a support coil according to the invention.
Figure 7:
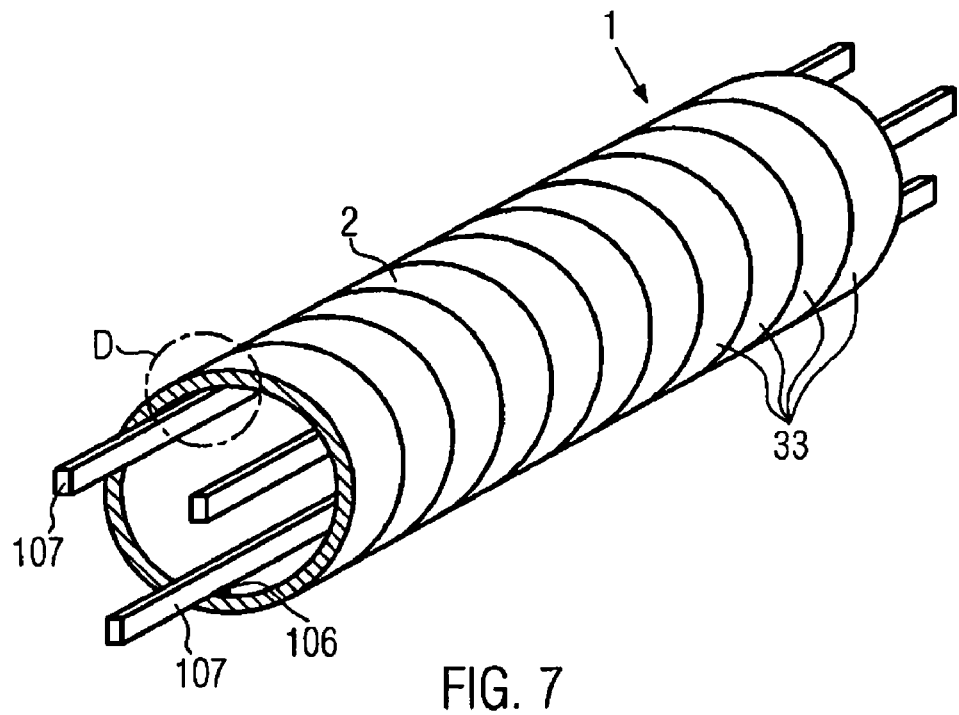
FIG. 7 shows a fourth embodiment of the support coil according to the invention, in a corresponding to that according to FIG. 6.
Figure 8:
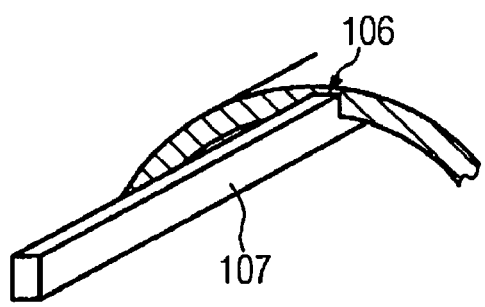
FIG. 8 shows an enlarged view of the detail D drawn in FIG. 7.

In the case of the embodiments shown in FIGS. 6 to 8, different supporting bodies are provided.

In the case of the embodiment shown in FIG. 6, a tubular adhesive film 105, which is first shown in the figure in unexpanded state, is inserted into the support coil 1. This tubular adhesive film 105 can be expanded radially outwards, by an internal pressure for example, and rested on the inner circumferential surface of the support coil 1. The supporting body, tubular adhesive film 105, extends over the whole axial length of the coil 1 and bridges all of the windings 33. By laying the film 105 on the inner circumferential surface the windings 33 are prevented from moving relative to each other. The windings 33, of the wound extruded profile body 2, retain their original diameter.

The adhesive film 105 is preferably provided on the inner circumferential surface of the wound extruded profile body 2, so that the adhesive film 105 can be pulled off from the inside before the support coil 1 is dismantled. The adhesive film 105 preferably has a tear-off tag for this purpose, which sticks out at least on one front side of the tubular support coil 1 and can easily be gripped by the user in order to remove the adhesive film 105.

FIGS. 7 and 8 show another embodiment, having a rotation prevention means, in which a plurality of grooves 106 are recessed in the inner circumferential surface of the support coil 1 in the circumferential direction. The grooves 106 extend in an axial direction related to the support coil 1 and run through the support coil 1. Rectangular rods 107 are inserted into the grooves 106 respectively as supporting bodies. The rectangular rods 107 run through the whole support coil 1, protruding beyond the support coil 1 at both ends. The rectangular rods 107 can accordingly be gripped at both of their protruding ends and be expelled from the grooves 106 in order to remove the positive securing of the diameter of the support coil 1.

As can be seen particularly in FIG. 8, the contour of the rod 107 is adapted to the contour of the groove 106, so that the rod 107 is retained in the groove 106 by being clamped. The rods 107 can, of course, be welded, glued or secured in other possible ways in the groove 106. The rod 107 may be formed by a metallic wire, which is kept in a the groove 106 formed during insertion of the hot wire in a plastic material of the wound extruded profile body 2 by melting and setting.

Figure 9:
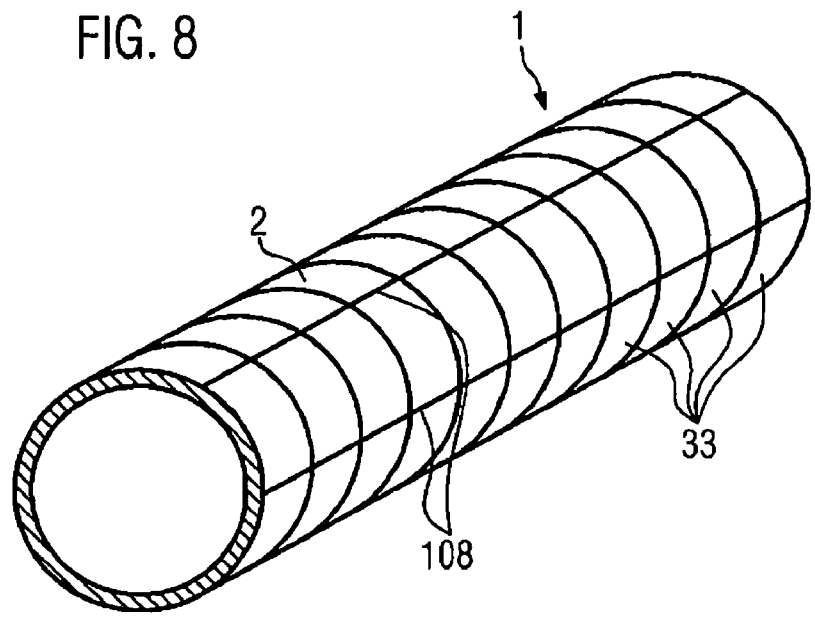
FIG. 9 shows a fifth embodiment of the support coil according to the invention in the view shown in FIGS. 6 and 7.

The supporting body in the embodiment shown in FIG. 9 is formed by welded webs 108 attached in a longitudinal direction. These welded webs 108 are welded onto the plastic material of the support coil 1. The adjacent windings 33 of the wound extruded profile body 2 of the support coil 1 are also secured relative to each other by overlay welding 108.

It must be ensured that the weld connection is carried out in the process so that it can be loosened by manual gripping of the rod 107 and the rod 107 can be removed from the extruded profile body 2.

The rod 107 inserted into the groove 106 can also be stuck in the groove 106 by a slight twisting of individual windings 33. During this procedure, the extruded profile body 2 is first manufactured by turning up the windings 33. Then a recess opening is created by mechanical processing on the inner and/or outer circumferential surface of the extruded profile body 2. The rod 107 is inserted into this groove 106. After that, the extruded profile body 2 is twisted slightly as a whole, so that the individual windings 33 push against each other, through which action the rod 107 is stuck on the border between adjacent windings 33, where a gap in the groove 106 is visible. Alternatively, the groove 106 can also be created during the manufacture of the extrusion from which the extruded profile body 2 is made. This procedure is especially suitable for the mass production of extruded profile bodies 2 with identical diameter. The groove 106 is formed along the whole length by the coiling of the windings 33 during the manufacture of the wound extruded profile body 2 in an axial direction.

The rod 107 may also include a cutting edged, which is capable of cutting into the material that forms the wound extruded profile body 2.

FIGS. 10 and 11 show another embodiment, in which the individual windings 33 of the support coil 1 are interspersed with recessed openings 109. The recessed openings 109, of all the windings 33, are formed in an axial direction in relation to recesses extending the support coil 1. In the embodiment shown, the support coil 1 has a large number of recesses distributed along the circumference, which open towards the front face of the support coil 1. In the case of the embodiment shown, a rod 110 has been inserted into one of the recess openings 109, acting as another rotation prevention means. The rod 110 has an eyelet 111 formed at one end, by being bent round, which makes gripping the rod 110 easier for pulling it out of the support coil 1. The other end of the rod 110 is straight. The other end can, however, be bent round to secure the extruded profile body 2 during transportation and oriented by bending substantially coaxially to the part of the rod 110, which is in the recess before the removal of the rod 110, so that it can be pulled out of the recess. It is also possible to configure the rod 110 slightly fluted, at least in the region of the recess, so that it rests resiliently on the walls of the recessed opening 109 and held in place inside the extruded profile bodies 2 so it cannot be lost, but can still be manually removed.

In the case of the alternative embodiment according to FIGS. 12 and 13, a rotation prevention means is provided in the form of a band 112, which is arranged inside the hollow support coil 1 and is laid as a loop 113. One end of the band 112 projects from the front face end of the support coil 1 as an end 114 on the attachment side. From there, the band 112 goes through the support coil 1 with its attachment portion 115 and comes out at the opposite end of the coil 1. To form the loop 113, the band 112 is bent round at this end through 180° and fed through the support coil 1 in the other direction to the attachment portion 115. A free end 117 of the band 112 protrudes from the end 114 on the attachment side and forms a handling portion 118, which projects beyond the front face end of the support coil 1.

The attachment portion 115 of the band 112 is connected to the inner circumferential surface of the support coil 1 by a welded or glued connection. This material-uniting or non-positive connection is indicated by the reference numeral 119 in FIG. 13. The connection 119 is formed such that the band 112 can be freed from the support coil 1 in the direction of the arrow P away from the support coil 1 by manual gripping and pulling on the handling portion 118 and pulled out of it.

The removal of the band 112 is simplified particularly in that the two ends 114, 117 of the band 112 are provided on the same front end of the extruded profile body 2. This leads to a configuration in which an attachment portion 115 of the band 112, which is connected to the inner circumferential surface of the extruded profile body 2, and which is preferably connected to all of the windings 33, is fed through from the front face through the support coil 1 and is bent round at 180° into a loop 113 at the opposite end. By pulling on the handling portion 118, the band 112 is bent in the region of a connection between the attachment portion 115 and the extruded profile body 2. During removal, the loop 113 travels through the support coil 1, causing deformation and an upward force applied behind the loop 113, and leads to dissolution of the connection 119. Afterwards, the rotation prevention means provided by the band 112 is removed.

The band 112 can be made from a textile for example, or from a plastic material. The configuration made with plastic material offers an advantage that the band 112 can be welded to an extruded profile body 2, which is also made from plastic material.

The handling portion 118 can have particular functional surfaces in the form of friction-increasing regions for this purpose and/or thickened regions, which enable a good grip of the handling portion 118.

Configurations, which make manual gripping easier, are intended here in particular. Counter functional surfaces can, however, just as well be provided for hand-operated tools, which cooperate with them. Eyelets or holes are intended, for example, in which the functional surface of a hand tool can engage.

Figure 14:
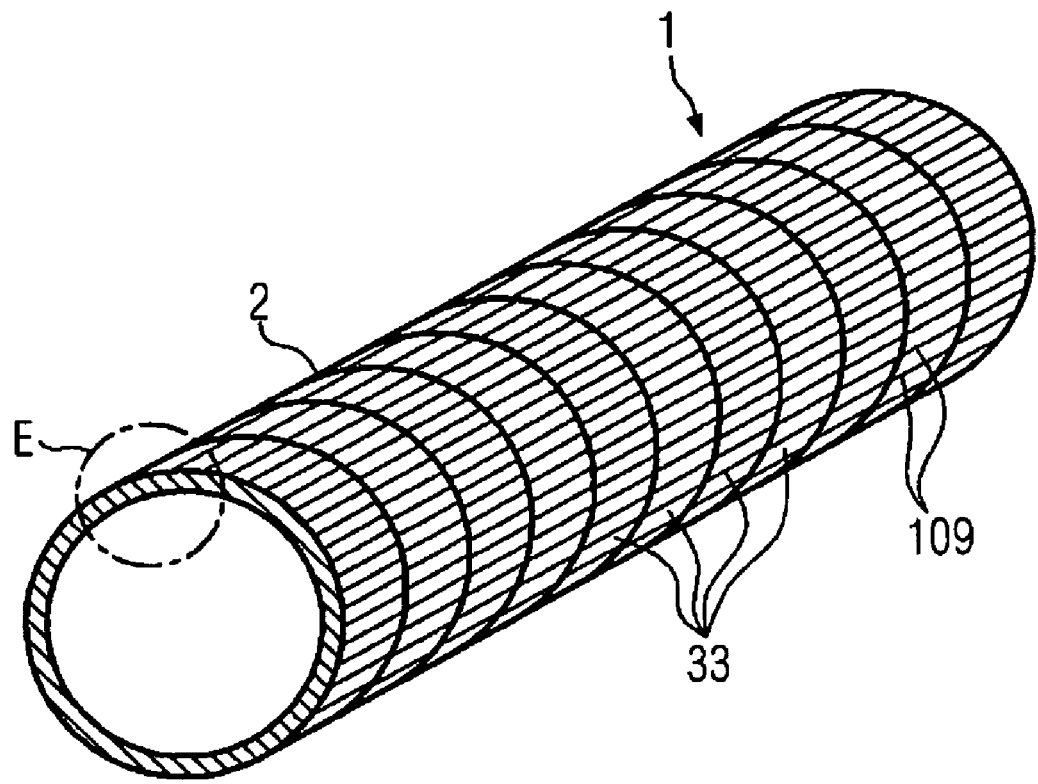
FIG. 14 shows a perspective side view of an eighth embodiment of the present invention and FIG. 15 shows an enlarged view of the detail E drawn in FIG. 14.
Figure 15:
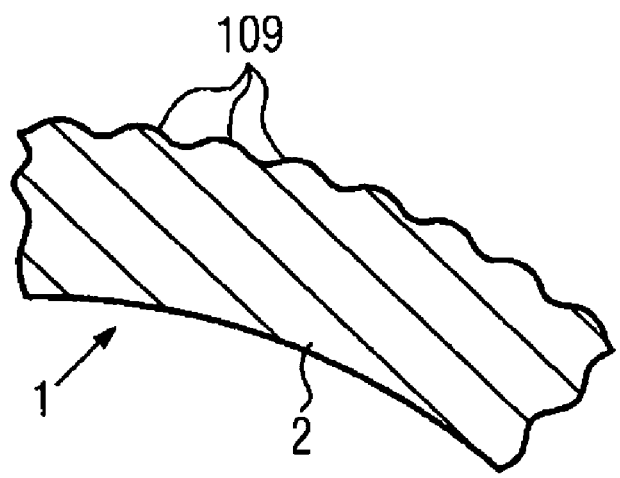

In the case of the embodiment shown in FIGS. 14 and 15, irregularities in the form of flutes 109 are again provided on the outer circumferential surface of the wound extruded profile body 2, and serve as another type of rotation prevention means. As FIG. 19 shows, the flutes 109 do not pass through in an axial direction, as in FIGS. 10 and 11. Rather, adjacent flutes 109, which can be configured as sharp-edged teeth or vanes, are usually non-forcibly offset when the individual windings 33 are coiled up. The flutes 109 are formed relatively softly in the embodiment shown (cf. FIG. 15). The resiliently expanded tubing material is laid onto this contouring on the outer circumference of the support coil 1 in a stressed state, and usually shapes itself plastically locally according to the contours of the flutes 109 and therefore also secures the adjacent windings 33 against each other positively.

The invention claimed is:

1. A support coil for radial support of resiliently expanded tubing material comprising:
at least one extruded profile body wound into a plurality of windings;
end faces of the extruded profile body being connected to each other at least in portions in a longitudinal direction of the support coil and interlocked by a ratchet arrangement in the longitudinal direction and by a tongue and groove arrangement in a radial direction, the tongue and groove arrangement being positioned between a radial external surface and a radial internal surface of the support coil with the tongue projecting from one end face and the groove forming an opening between an opposite end face and a ratchet element of the ratchet arrangement;
a rotation prevention means, through which adjacent windings are held secure against rotation; and
at least one supporting body, which extends along at least two adjacent windings and which is fixed to the circumferential surface of the wound extruded profile body.

2. The support coil according to claim 1, wherein the end faces of the adjacent windings and/or an outer circumferential surface of the wound extruded profile body, which is attachable to the tubing material, are provided with friction-increasing irregularities.

3. The support coil according to claim 2, wherein the irregularities formed on the end faces are provided radially outside the tongue and groove arrangement.

4. The support coil according to claim 2, wherein adjacent end faces have corresponding irregularities.

5. The support coil according to claim 2, wherein the irregularities are arranged on the outer circumferential surface of the wound extruded profile body, distributed at least in portions.

6. The support coil according to claim 2, wherein the irregularities are projections that are provided on the outer circumferential surface of the wound extruded profile body, extending substantially in an axial direction thereof.

7. The support coil according to claim 6, wherein the outer circumferential surface of the wound extruded profile body has a fluted contoured effect.

8. The support coil according to claim 1, wherein the supporting body is formed by a rod extending substantially in an axial direction and bridging at least two adjacent windings, and which is connected to the inner circumferential surface of the extruded profile body.

9. The support coil according to claim 8, wherein the rod is inserted into a groove, which corresponds to it on the inner circumferential surface of the wound extruded profile body and extends substantially in an axial direction thereof.

10. The support coil according to claim 1, wherein the supporting body is formed by a metallic wire, which is kept in a recess formed during insertion of the hot wire in a plastic material of the wound extruded profile body by melting and setting.

11. The support coil according to claim 8, wherein the rod has a cutting edge, which is cut into the material that forms the wound extruded profile body.

12. The support coil according to claim 1, wherein the supporting body comprises a band, which is laid in the form of a loop and arranged inside the support coil, and which is constructed in one portion as removably connectable to the inner circumferential surface of the extruded profile body and in another portion extending out of the support coil.

13. The support coil according to claim 12, wherein two ends of the band are provided on the same front face end of the extruded profile body.

14. The support coil according to either claim 12, wherein the band has a portion that is substantially freely guided in the extruded profile body, and the end of which extends out of the extruded profile body to form a handling portion.

15. The support coil according to claim 1, wherein the supporting body is fitted onto the circumferential surface of the wound extruded profile body by overlay welding.

16. The support coil according to claim 1, wherein the supporting body comprises an adhesive film.

17. The support coil according to claim 16, wherein the adhesive film is bonded around part of the inner circumferential surface of the wound extruded profile body.

18. The support coil according to claim 16, wherein the adhesive film is provided with a tear-off tag.

19. The support coil according to claim 1, wherein adjacent windings are soldered or bonded together.

20. A support coil for radial support of resiliently expanded tubing material comprising:
at least one extruded profile body wound into a plurality of windings;
end faces of the extruded profile body being connected to each other at least in portions in a longitudinal direction of the support coil and interlocked by a ratchet arrangement in the longitudinal direction and by a tongue and groove arrangement in a radial direction, the tongue and groove arrangement being positioned between a radial external surface and a radial internal surface of the support coil with the tongue projecting from one end face and the groove forming an opening between an opposite end face and a ratchet element of the ratchet arrangement; and a rotation prevention means, through which adjacent windings are held secure against rotation;

wherein the end faces of the adjacent windings and/or an outer circumferential surface of the wound extruded profile body, which is attachable to the tubing material, are provided with friction-increasing irregularities.

21. The support coil according to claim 20, wherein the irregularities formed on the end faces are provided radially outside the tongue and groove arrangement.

22. The support coil according to claim 20, wherein adjacent end faces have corresponding irregularities.

23. The support coil according to claim 20, wherein the irregularities are arranged on the outer circumferential surface of the wound extruded profile body, distributed at least in portions.

24. The support coil according to claim 20, wherein the irregularities are projections that are provided on the outer circumferential surface of the wound extruded profile body, extending substantially in an axial direction thereof.

* * * * *